P. A. CAMPBELL.
LAWN MOWER.
APPLICATION FILED JUNE 24, 1921.
1,423,999.
Patented July 25, 1922.
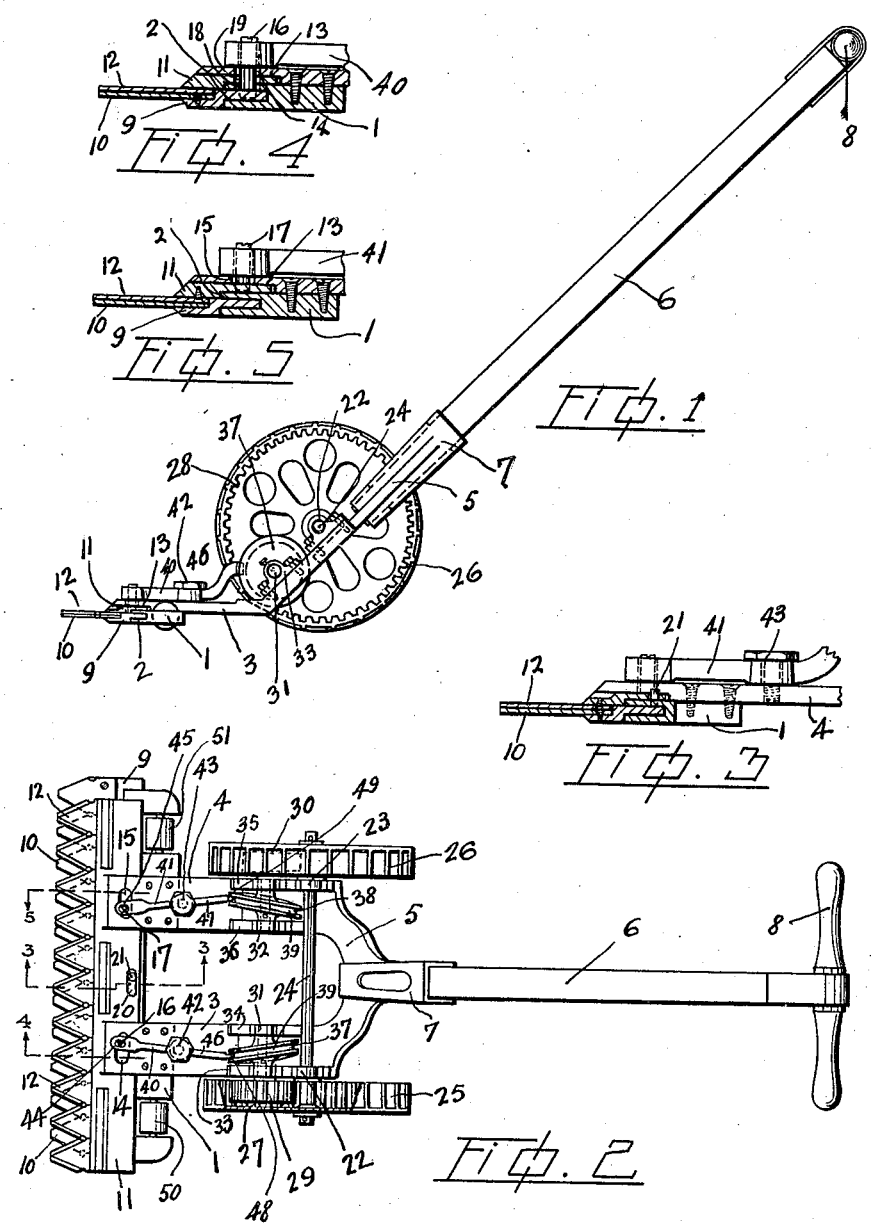

UNITED STATES PATENT OFFICE.

PHILIP ALEXANDER CAMPBELL, OF VANCOUVER, BRITISH COLUMBIA, CANADA.

LAWN MOWER.

1,423,999.        Specification of Letters Patent.    Patented July 25, 1922.

Application filed June 24, 1921. Serial No. 480,072.

*To all whom it may concern:*

Be it known that I, PHILIP ALEXANDER CAMPBELL, a subject of the King of Great Britain, and a resident of the city of Vancouver, in the Province of British Columbia, Canada, have invented certain new and useful Improvements in Lawn Mowers, of which the following is a specification.

My invention relates to improvements in lawn mowers, and the object of my invention is to devise a mower in which the cutting blades operate laterally in shear-like fashion so that the grass is shear cut as opposed to the rotary method of cutting and is therefore cut more closely, evenly, and cleanly, thus maintaining its greenness and vigor. A further object is to provide a mower in which strain on the parts during operation is reduced to the minimum and thus the life of the machine is lengthened and replacement of new parts due to wear and tear is seldom required.

I attain these objects by the construction illustrated in the accompanying drawings in which—

Fig. 1 is a side view of the mower, the near side main wheel being removed.

Fig. 2 is a plan view.

Fig. 3 is a fragmentary sectional view taken through line 3—3 of Fig. 2.

Fig. 4 is a fragmentary sectional view taken through the line 4—4 of Fig. 2.

Fig. 5 is a fragmentary sectional view taken through the line 5—5 of Fig. 2.

Similar figures of reference indicate similar parts throughout the several views.

1 indicates a horizontal plate having a slot 2 in its front edge which plate is secured transversely to the forked lower ends 3 and 4 of the frame 5 of the mower, the upper end of the frame being inclined upwardly at the proper angle for positioning correctly the operating handle 6, which is of the usual type, being seated at its lower end in a socket 7 formed on the frame while at its upper end it is provided with the cross-bar 8.

Slidably mounted for lateral movement in the slot 2 is a lower knife-carrying bar 9 to which is secured a plurality of spaced knives 10 similar to those found in moving sickles, that is, substantially flat triangular shaped blades, the opposite converging edges of which are sharpened, while slidably mounted on top of the plate 1 for lateral movement thereon and in sliding contact with the lower bar 9 is an upper knife-carrying bar 11 also having secured to it a plurality of knives 12, and the front part of each forked end 3 and 4 is cut away, as shown at 13 in Figs. 4 and 5, so that a slot is formed between the forked end and the plate 1 in which the upper bar is slidably movable. Each forked end 3 and 4 is provided with a slot 14 and 15 respectively through which extend pins 16 and 17, pin 17 being secured vertically to the upper bar 11, as shown in Fig. 5, while pin 16 is secured vertically to the lower bar 9 and extends upwardly through slots 18 and 19 formed in the plate 1 and the upper bar 11 corresponding to the slot 14, and these slots are of sufficient length to permit full travel of the pins therein as the knife bars are moved during the operation of the machine. The upper knife bar 11 is further provided with a slot 20 at midlength in which is laterally reciprocable a vertical pin secured into the upper knife bar 11.

22 and 23 indicate bearings formed on opposite sides of the frame 5 in which is rotatably mounted a shaft 24 which extends through the bearings and is provided on its opposite ends with the main wheels 25 and 26 on which the machine is movable, these wheels being formed with internal gears 27 and 28, and meshing with these gears are smaller pinions 29 and 30 secured respectively to the outer ends of shafts 31 and 32 rotatably mounted in bearings 33—34 and 35—36 formed on the frame, as shown in Figs. 1 and 2. Secured to the shafts 31 and 32 to rotate between the respective bearings are sheaves 37 and 38 the peripheries of which are grooved, as at 39, and these sheaves are offset at an angle, with relation to their horizontal or shafts axis, so that when rotated their front edges will move laterally to opposite sides of their other horizontal axis, or in other words, the front edges of the sheaves when rotated will make two lateral strokes, inwards and outwards respectively, with each revolution of the sheave, the length of each stroke being equal to the amount of offset, and the sheaves are arranged so that their front edges are offset away from each other, as shown in Fig. 2, when at the end of the outstroke.

40 and 41 indicate levers mounted on the forked ends 3 and 4 respectively and fulcrumed on screws 42 and 43 secured into the said ends, each of these levers being eyed at its outer end, as at 44 and 45, engaging respectively the pins 16 and 17, while their opposite ends 46 and 47 are reduced slightly, as at 48 and 49 and rest in the peripheral grooves 39 of the sheaves 37 and 38.

The front part of the mower is carried on suitable small rollers 50 and 51.

The manner in which the device operates will be apparent, as it will be seen that on moving it forward the sheaves 37 and 38 are rotated, making the strokes already described so that the levers 40 and 41 are swung on their fulcrums 42 and 43, causing the front ends of the levers to move to and from each other, and as these ends are connected to the pins 16 and 17 which are in turn secured to the respective upper and lower knife blades, the blades are consequently moved to and fro in opposite directions over each other so that the knives cut the grass between them in the same manner as shears.

From the foregoing it will be seen that I have devised a lawn mower which is highly practical and of great service.

What I claim as my invention is:—

1. A lawn mower comprising a wheeled frame forked at its lower front end and provided in each forked arm with a transverse slot, a transverse plate secured to the forks of the frame having a slot in its front edge and a slot registering with one of the fork slots, a lower knifed bar having its rear edge slidably mounted in said front edge slot, an upper knifed bar superposed on said plate having a slot resistering with the fork and plate slots aforesaid, a vertical pin secured to said lower knifed bar projecting through the upper knife slot, the plate slot, and the fork slot, a vertical pin secured to the upper knifed bar projecting through the other fork slot, and means for simultaneously imparting opposite reciprocating motion to said pins.

2. A lawn mower comprising a wheeled frame forked at its lower front end provided in each forked arm with a transverse slot, a transverse plate secured to the forks of the frame having a slot in its front edge and a slot registering with one of the fork slots, a lower knifed bar having its rear edge slidably mounted in said front edge slot, an upper knifed bar superposed on said plate having a slot registering with the fork and plate slots aforesaid, a vertical pin secured to said lower knifed bar projecting through the other fork slot, a vertical pin secured to the upper knifed bar projecting through the other fork slot, a pair of sheaves rotatably mounted on opposite sides of the frame each offset so that its forward edge moves laterally inwardly and outwardly as the sheave is rotated, a pair of levers each fulcrumed intermediate its length on opposite sides of the frame, the outer ends of said levers being connected respectively to the upper knife bar pin and the lower knife bar pin, their inner ends being in engagement respectively with said sheaves, and means for rotating said sheaves.

Dated at Vancouver, B. C., this 9th day of June, 1921.

PHILIP ALEXANDER CAMPBELL.